United States Patent [19]

Vlahek

[11] Patent Number: 5,749,167
[45] Date of Patent: May 12, 1998

[54] FISHING EQUIPMENT

[76] Inventor: Josip Vlahek, 54 Gordon Street, Tullamarine, Victoria 3043, Australia

[21] Appl. No.: 390,975

[22] Filed: Feb. 21, 1995

[30] Foreign Application Priority Data

Feb. 22, 1994 [AU] Australia .................. PM4005/94

[51] Int. Cl.$^6$ ............................................ A01K 85/00
[52] U.S. Cl. .................................................. 43/42.06
[58] Field of Search .......................... 43/42.06, 42.05, 43/42.35, 41, 42.19, 42.2

[56] References Cited

U.S. PATENT DOCUMENTS

| | | | |
|---|---|---|---|
| 3,449,852 | 6/1969 | Mitchell | 43/42.06 |
| 3,507,070 | 4/1970 | Rossello | 43/42.06 |
| 3,722,128 | 3/1973 | Tremblay | 43/42.06 |
| 3,835,572 | 9/1974 | Mounsey | 43/42.06 |
| 3,916,556 | 11/1975 | Armanuno | 43/42.06 |
| 3,938,275 | 2/1976 | Fukushima | 43/42.06 |
| 4,257,182 | 3/1981 | Thom | 43/42.06 |
| 4,267,658 | 5/1981 | Brown | 43/42.06 |
| 5,148,622 | 9/1992 | Blair | 43/42.06 |
| 5,155,947 | 10/1992 | Rivard | 43/42.06 |
| 5,265,368 | 11/1993 | Taylor | 43/42.06 |

*Primary Examiner*—Kurt Rowan
*Attorney, Agent, or Firm*—Edwin D. Schindler

[57] ABSTRACT

A fishing lure which can be used in association with a hook on a line or also in association with a squid jig which fishing lure has at least one aperture sealed with a spring loaded member which, when depressed, allows for the injection of berley. The fishing lure has at least one aperture through which the burley can be released and it is also capable of exhibiting a degree of motion when in use in the water.

6 Claims, 2 Drawing Sheets 5,749,167

FISHING EQUIPMENT

This invention relates to fishing equipment and, in particular, to lures of various types for use in fishing.

The provision of various types of lures, some of which are passive and some of which are active, to be used in fishing is well known. These lures have had varying degrees of success depending upon the application required however the basic aim is to produce a lure which the fish sought after will mistake for a food source.

Basically, suitable movement, shape and/or fish smell are desirable attributes in a fishing lure and while some lures have displayed a realistically fishlike appearance this has not been combined with a suitable berley source. Most attempts in this direction have involved dipping the lure in fish oil or somehow attaching a berley source to the line usually in the form of some fish oil soaked cloth attached to the line near the lure. This of course negatively affects the appearance of the lure and hence its effectiveness. This invention relates to an improvement in such lures.

It is the object of this invention to provide a fish lure which can be used either in association with a hook on a line or also in association with a squid jig and which can exhibit the motion and attractive appearance required from a fishing lure while also acting as a source of berley.

The invention, in its broadest sense, comprises a fishing lure, capable of exhibiting a degree of motion when in use in the water, which also acts as a continuous source of berley.

It is envisaged that the lure could be used either in association with a conventional hook and fishing line arrangement or in association with a squid jig.

I have previously produced a product sold under the trade mark Je Jo, which is in the form of a hollow cone of a synthetic material having an aperture at the apex of the cone through which the line can pass. This cone floats free from the hook when immersed in water but can move down and help prevent the hook or hooks from snagging when the line is retracted. It is envisaged that the lure could be used in association with hooks or other tackle protected by such a cone.

In order that the invention may be more readily understood two preferred embodiments of the invention will be described with reference to the accompanying drawings.

The lure may have connected to one end thereof a hook 51 or a gang of hooks or a squid jig 15.

Figure 1:
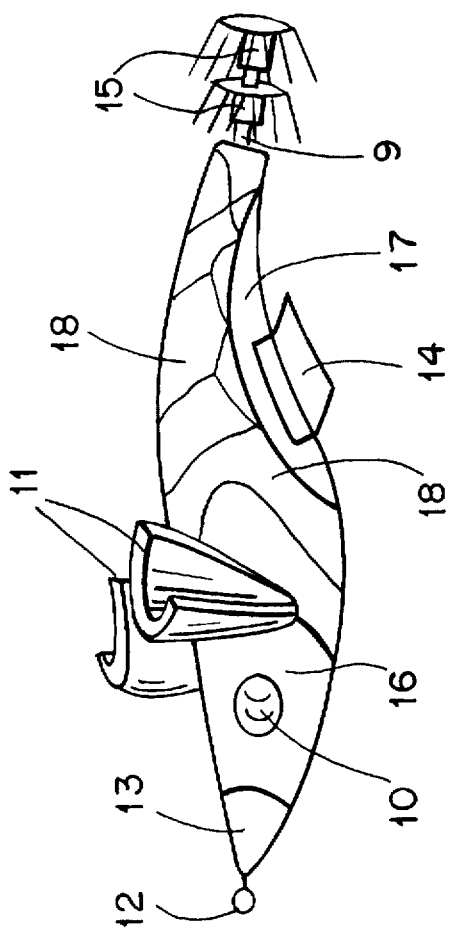
FIG. 1 shows a schematic diagram of the lure when used in association with a squid jig.

FIG. 1 shows the features of the preferred embodiment of the lure when it is used with a squid jig 15. The jig is shown attached at the back of the lure in this embodiment to a plastic tubular device 9 affixed within the lure. It is envisaged however that any appropriate method of attachment can be used.

In each embodiment fishing line can be attached to a ring or eyelet 12. However in the second embodiment of the invention, as shown in FIG. 2, eyelet 12 is in turn is connected to a rod 26, which is preferably of metal, which passes through the lure to terminate in an eyelet 41 or the like to which hooks 51, a gang of hooks or the like can be connected.

Figure 2:
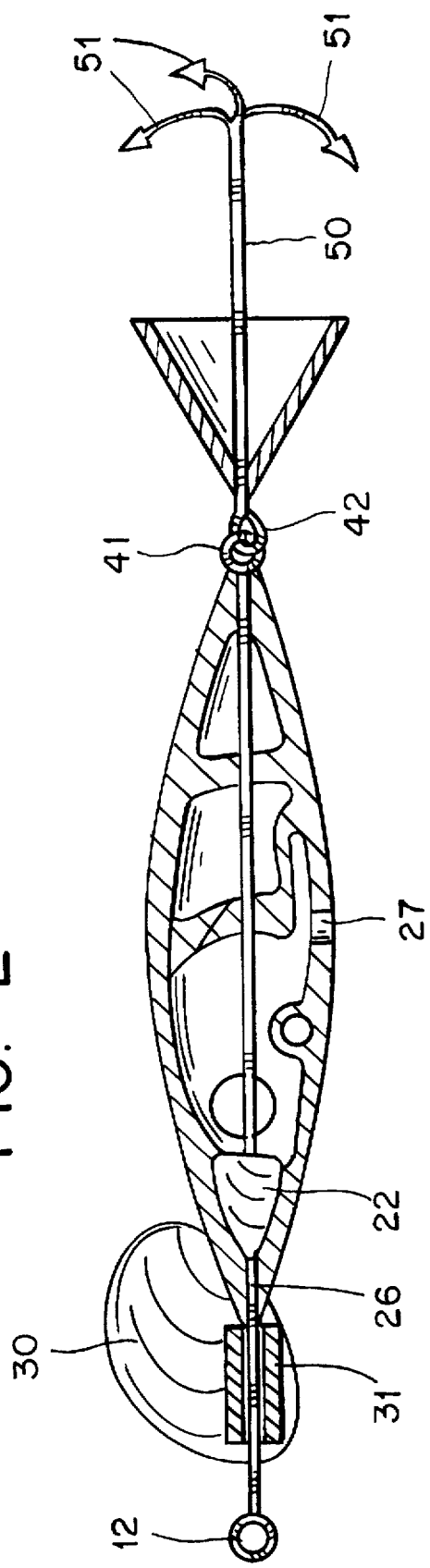
FIG. 2 shows a cross-section through the lure when associated with a hook and line arrangement.

FIG. 2 also shows connection of the lure to the eyelet 42 at the end of the shank part 50 of the hook or hooks 51.

Also shown is the cone 40 which can move along the shank 50 so that when the apparatus is immersed in water the cone 40 floats free of the hooks but when the line is to be retracted from the water the protective cone will cover the hooks to prevent snagging. Whether or not the cone is used in conjunction with the lure is however not germane to this invention.

In both embodiments of the invention, depending upon the application required, the lure may be used as is but generally it would be preferred that the lure also carry a weight to ensure that its orientation, when in use, approximates that of a fish of a similar size. In such applications, weight material can be placed in a cavity 22 in the front section 13 of the lure before it is assembled.

The exact location of such a weight compartment is not germane to the invention and would depend on the shape of the lure used and its position would be determined so as to provide the orientation described above.

Figure 3:
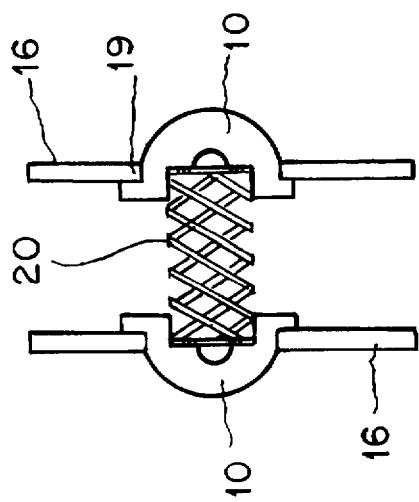
FIG. 3 shows a cross-section through the eyeball arrangement of the lure.
Figure 6:
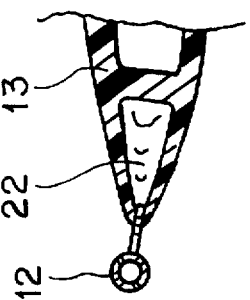
FIG. 6 is a cross-section through the front end of the lure where a weight may be placed.

The lure can provide a continuous source of berley in that the eyes of the lure 10 are connected by a spring 20, located in aperture 77 (as illustrated in FIG. 3), such that normally their bases 19 are flush with the front face 16 of the lure. When either of the eyes is depressed it is possible to fill the lure with berley such as tuna oil. This berley can then drain continuously from an open aperture 27 in the belly 17 of the lure.

If required a dispenser for berley is available which moves the eye of the lure to permit direct feeding of berley into the interior of the lure.

Figure 5:
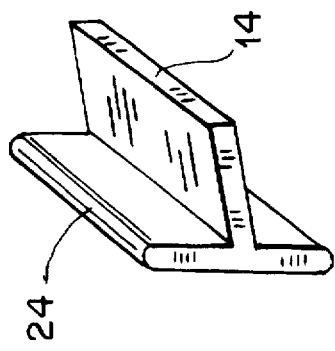
FIG. 5 is a diagrammatic representation of the fin affixed in the belly of the lure.
Figure 8:
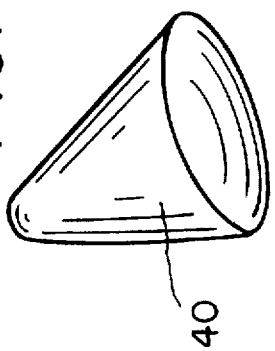
Figure 4:
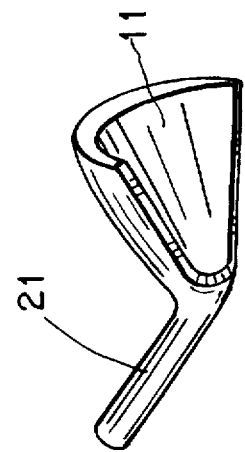
FIG. 4 is a diagrammatic representation of one of the lure's fins.

FIG. 5 shows a fin component of the lure which can be affixed in the belly of the lure. In this embodiment of the invention the fin 14 can be positioned where required in a recess 67 in the belly 17 of the lure as its base 24 can slide within recess 67. The size of the hole in the base of the lure can be determined by the position of the fin 14. It is envisaged that this fin could be fixed in different positions to allow different berley flow rates.

In these preferred embodiments the fins 11 are basically aerofoils which can be positioned into the lure by shafts 21 and when the lure is moved through the water these cause it to rotate about its longitudinal axis. These fins 11 can be oriented at any angle desired to affect the motion of the lure when in use and can also be positioned at any desired place on the on the lure.

Figure 7:
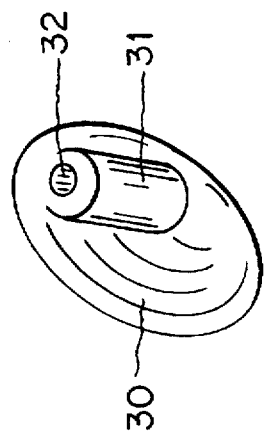
FIG. 7 is a diagrammatic representation of a spinner device which may be placed at the front of the lure; and, FIG. 8 is a diagrammatic representation of a cone as shown in FIG. 2.

Alternatively there is provision for a spinner device 30 shown in FIG. 7 which has a section 31 with coaxial orifice 32 through which the rod 26 through the lure can pass to its attachment point 12 to a line.

The spinner is shaped so that it will rotate when pulled through the water and it is envisaged that it could also be have a mirrored surface or have a mirror device attached to it.

In a further embodiment of the invention the front of the body of the lure is open and is closed by a spring loaded ball device which allows berley to be input to the lure. In the preferred embodiments of the invention, for aesthetic reasons, the eyes 10 of the fishlike lure are the entry points for the berley however it is the spring loaded sealing of the entry points which is novel in this invention and the exact shape of the lure or the location and number of entry points or the shape of the sealing device of such entry points is not limited in this invention. Neither is the number and placing of exit apertures so limited.

It can be seen that the lure of the invention is basically versatile.

It can readily be made of different sizes and different colours and it can be used either closely adjacent the hooks or at some distance therefrom and the arrangement of hooks can be selected for any particular purpose.

Whilst in the preferred embodiments we have described the lure as having been made to resemble a fish shape, it will be understood that while this is presently a preferment, it could well be possible to make the lure of any required shape. All such variations and modifications are deemed to be within the scope of the invention.

I claim:

1. A fishing lure, capable of exhibiting a degree of motion when in use in water, which acts as a continuous source of berley, said fishing lure comprising an aperture with a spring loaded member which, when depressed, allows for an injection of berley, a fin being located in a recess in a belly of the lure, and an open aperture for allowing a release of the berley, so that a position in which the fin is fixed determines the size of the open aperature for release of the berley, and means for attachment to at least one hook or a squid jig.

2. A fishing lure as claimed in claim 1 with at least one aerofoil shaped fin which can be adjustably oriented on the lure.

3. A fishing lure as claimed in claim 1 which has a longitudinal axial rod passing through the lure to terminate in front and rear eyelet devices at either end of the lure.

4. A fishing lure as claimed in claim 3 in which a spinner device is located on the longitudinal rod at the front end of the lure adjacent the front eyelet.

5. A fishing lure as claimed in claim 1 which has a cone shaped device which can move along the shank of a hook such that it floats away from the hook when immersed in water and covers the hook when the lure and hook are retracted from the water.

6. A fishing lure as claimed in claim 1 with provision for a weight device to be incorporated within the lure.

\* \* \* \* \*